United States Patent
Bedi et al.

(10) Patent No.: US 8,799,469 B2
(45) Date of Patent: Aug. 5, 2014

(54) SUBSCRIBER MESSAGE PAYLOAD HANDLING

(75) Inventors: Bharat V. Bedi, Winchester (GB); Helen S. Bowyer, Winchester (GB); Kevin C. Brown, Winchester (GB); Edward G. Jellard, Winchester (GB); Robert S. Smart, Winchester (GB); Graham White, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/407,199

(22) Filed: Feb. 28, 2012

(65) Prior Publication Data

US 2012/0233272 A1 Sep. 13, 2012

(30) Foreign Application Priority Data

Mar. 11, 2011 (EP) .................................. 11157889

(51) Int. Cl.
*G06F 15/173* (2006.01)
*G06F 15/16* (2006.01)
*H04L 12/28* (2006.01)
*H04J 3/16* (2006.01)

(52) U.S. Cl.
USPC ............ 709/225; 709/206; 370/389; 370/466

(58) Field of Classification Search
None
See application file for complete search history.

(56) References Cited

U.S. PATENT DOCUMENTS

| | | | |
|---|---|---|---|
| 6,643,682 B1 | 11/2003 | Todd et al. | |
| 6,944,662 B2* | 9/2005 | Devine et al. | 709/225 |
| 7,643,511 B2* | 1/2010 | Barri et al. | 370/466 |
| 7,734,723 B2 | 6/2010 | Bedi et al. | |
| 7,965,708 B2* | 6/2011 | Cohen et al. | 370/389 |
| 8,576,881 B2* | 11/2013 | Jungck et al. | 370/498 |

* cited by examiner

*Primary Examiner* — Wen-Tai Lin
(74) *Attorney, Agent, or Firm* — Lee Law, PLLC; Christopher B. Lee (57) ABSTRACT

A first message published by a first publisher, including a message header and payload data, is received. The payload data within the first received message is identified, extracted, and stored. A second message published by a second publisher, including function data that provides a function to modify the payload data, is received. The function data within the second received message is identified, extracted, and stored. The extracted and stored payload data is modified using the stored function. A third message, including the modified payload data, is created for distribution to a subscriber configured to process the modified payload in the third message.

20 Claims, 6 Drawing Sheets

/country/uk/city/london/temperature/celsius
/country/uk/city/birmingham/temperature/celsius
/country/uk/city/southampton/temperature/celsius
/country/uk/city/bristol/temperature/celsius
/country/uk/city/manchester/temperature/celsius
/country/uk/city/liverpool/temperature/celsius
/country/uk/city/leeds/temperature/celsius
/country/uk/city/edinburgh/temperature/celsius
/country/uk/city/glasgow/temperature/celsius
/country/uk/city/cardiff/temperature/celsius
/functions/celsiusToFahrenheit

FIG. 8

SUBSCRIBER MESSAGE PAYLOAD HANDLING

RELATED APPLICATIONS

This application claims priority to and claims the benefit of European Patent Application Serial No. EP11157889.4 titled "SUBSCRIBER MESSAGE PAYLOAD HANDLING," which was filed in the European Patent Office on Mar. 11, 2011, and which is incorporated herein by reference in its entirety.

BACKGROUND

The present invention relates generally to the field of computers and computer systems. More particularly, the present invention relates to publish/subscribe messaging systems providing controlled distribution of messages from a source to one or more targets.

Publish/subscribe is a technique for handling of message queues. Rather than directly identifying an intended recipient for a message, the originator (publisher) publishes the message to a topic, which topic is typically identified in the message header. One or more recipients (subscribers) may then arrange to receive such messages by subscribing to the topic. A message handling or brokering stage sits between the publishers and subscribers, and handles the routing of published messages to subscribers according to topic. In this way, the publisher does not need to know the identities of the various subscribers and the subscribers do not need to know the publisher providing the source of the messages.

BRIEF SUMMARY

In accordance with a first aspect of the present invention there is provided an apparatus for modified payload data handling in a publish/subscribe system comprising: a processor; a memory coupled with the processor; a first computer handler for handling a received first message published by a first publisher, the first message comprising a message header and payload data, with the first computer handler being configured to identify and extract the payload data and store the payload data in the memory; a second computer handler for handling a received second message published by a second publisher, the second message comprising function data that provides a function to modify the payload data, with the second computer handler being configured to identify and extract the function data and store the function data in the memory; a generator configured to modify the extracted and stored payload data according to the stored function; and an inserter configured to insert the modified payload data into a third message for distribution to a subscriber configured to process the modified payload data in the third message.

With the second publisher (which may also be the first publisher, a subscriber, or a third party) publishing functions for message payload transformation, the range of functions hosted by a broker and available to multiple subscribers may be dynamically augmented and updated, providing for greater operational flexibility.

In such an apparatus, the first and second computer handlers may comprise a single device adapted/configured to distinguish between a received first message and a received second message, for example by parsing of the message header. The handlers may be discrete devices or may, for example, comprise software routines run by the apparatus processor.

In one embodiment, where the message header of the received first message includes topic data, the memory may contain a topic tree (for the distribution of messages to subscribers according to topic), with the second computer handler being adapted/configured to store the extracted function data in a predetermined (and reserved) location within the topic tree.

The further computer handler is preferably operable to receive and process a plurality of second messages and store the respective sets of function data received via the plurality of second messages, with the generator being adapted/configured to identify which, if any, set of stored function data to use in the modification of payload data of a received first message. Also, the second computer handler may be adapted/configured to, in response to receipt of a predetermined command, delete or modify the stored function data. In one embodiment, the modification may be achieved by having the second publisher republish (in amended form) an existing function message.

Also in accordance with the present invention there is provided a method for modified payload data handling in a publish/subscribe system comprising receiving a first message published by a first publisher, the first message comprising a message header and payload data; identifying the payload data within the received first message; extracting and storing the payload data; receiving a second message published by a second publisher, the second message comprising function data that provides a function to modify the payload data; identifying the function data within the received second message; extracting and storing the function data; using the stored function to modify the extracted and stored payload data; and creating a third message comprising the modified payload data for distribution to a subscriber configured to process the modified payload in the third message.

The method may further comprise receiving a plurality of second messages, extracting and storing the respective sets of function data received via the plurality of second messages, and determining for the received first message which, if any, stored function data to use to modify the payload data thereof.

The subscriber may be the second publisher, enabling users to upload functions that they wish to have applied to messages. In such a scenario, where there are a plurality of subscribers, at least one of them may subscribe to receive payload data modified by a function originated by another subscriber.

The method may include, in response to receipt of a predetermined command, deleting or amending stored function data. A source of the predetermined command may also be verified as a precondition of deleting the stored function data.

Where there are a plurality of first publishers publishing messages to respective topics and a plurality of subscribers each receiving messages on one or more topics, in response to receipt of a predetermined command, one of a plurality of sets of stored function data may be applied to modify the payload data of all messages published to an identified topic.

The first publisher may also be the second publisher, that is to say one publisher may provide both data payload messages and function data messages (typically providing functions that may suitably be applied to data payloads originating from that one publisher).

The present subject matter further provides a computer program stored on a computer readable medium and loadable into the internal memory of a digital computer, comprising software code portions, when said program is run on a computer, for performing the methods according to the present subject matter and as described above and in more detail below.

Also in accordance with the present invention there is provided a computer program product comprising a computer readable storage medium including computer readable program code, where the computer readable program code when executed on a computer causes the computer to receive a first message published by a first publisher, the received first message comprising a message header and payload data; identify the payload data within the received first message; extract and store the payload data; receive a second message published by a second publisher, the received second message comprising function data that provides a function to modify the payload data; identify the function data within the received second message; extract and store the function data; use the stored function to modify the extracted and stored payload data; and create a third message comprising the modified payload data for distribution to a subscriber configured to process the modified payload in the third message.

The summary of the present subject matter does not recite all the features of the description herein, and sub-combinations of those features may also encompass the present subject matter.

BRIEF DESCRIPTION OF THE SEVERAL VIEWS OF THE DRAWINGS

The present invention will now be described, by way of example only, with reference to preferred embodiments, as illustrated in the following figures, in which.

DETAILED DESCRIPTION

It should be noted that conception of the present subject matter resulted from recognition of certain limitations associated with publish/subscribe messaging systems. For example, it was recognized that data being published onto a message queue may need to be normalized before it may be subscribed to. Regarding normalization, for example, it was further recognized that in a scenario where several users (typically programs running on remote machines) are subscribing to receive temperature data from several sensors, if that data is published in Celsius but is required to be in Fahrenheit, then each user must convert from Celsius to Fahrenheit. In such a scenario, each user would need to have their own conversion function and errors may lead to the different programs having different data. Similarly, it was recognized that if all sensors are replaced with another type of sensor that produces data in another form (for example Kelvin), the conversion function code on every single subscriber device would have to be changed to manipulate the data from the new format to the old format. It was additionally observed that while an existing system attempts to alleviate the problem by incorporating one or more message transformation subsystems within a broker, and the subsystems apply a transform function to selected messages, using the temperature example from above, the broker would have an internal Celsius to Fahrenheit conversion function and users may then subscribe to receive the temperature data in either Celsius or Fahrenheit. However, it was observed that a first problem with this approach is that modifying the message will result in a change of topic, which may cause housekeeping problems within the broker in terms of the hierarchical topic tree used for message distribution. It was additionally observed that a second problem with this approach is that allowing the subscribers to subscribe to particular transforms relies on the transforms being available on the broker. It was also observed that another example of a publish/subscribe system that seeks to address the first problem referenced above, namely the modification of topics, results in the publisher not specifying the topic directly, but instead sends topic data which is then processed to a topic within the message broker. It was observed that this form of processing limits publisher control of its published messages and that the availability of transform functions is constrained. It was additionally observed that this form of processing uses specific transforms that are set up on the broker as a one-time operation without the flexibility of actually letting the users specify the function. In view of these observations, it was determined that allowing users to dynamically add, remove, and edit functions on the broker that may be used by both themselves and other users would be advantageous for publish/subscribe systems. The present subject matter improves publish/subscribe systems and provides technology for enabling improved operational flexibility in a publish/subscribe system.

Figure 1:
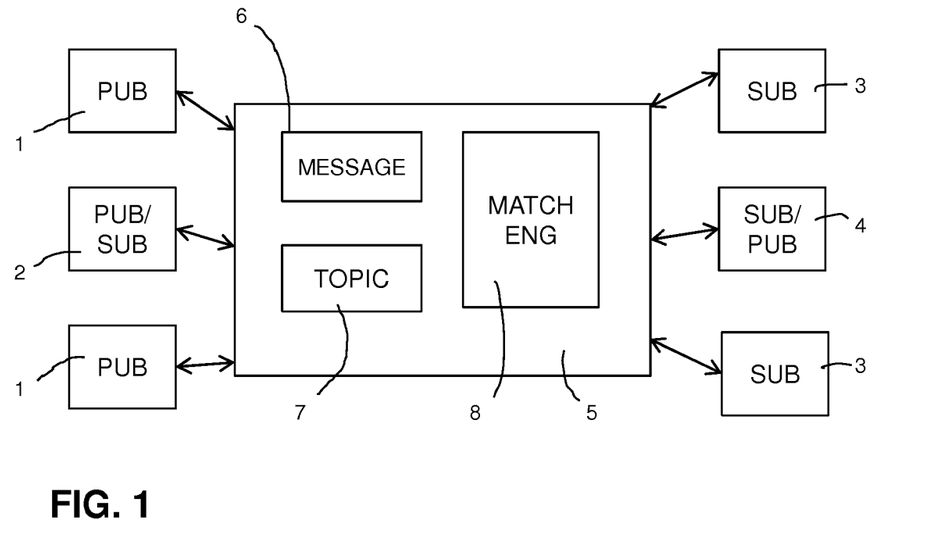
FIG. 1 is a block diagram of components of an example of an implementation of a publish/subscribe system in accordance with the present subject matter.
Figure 6:
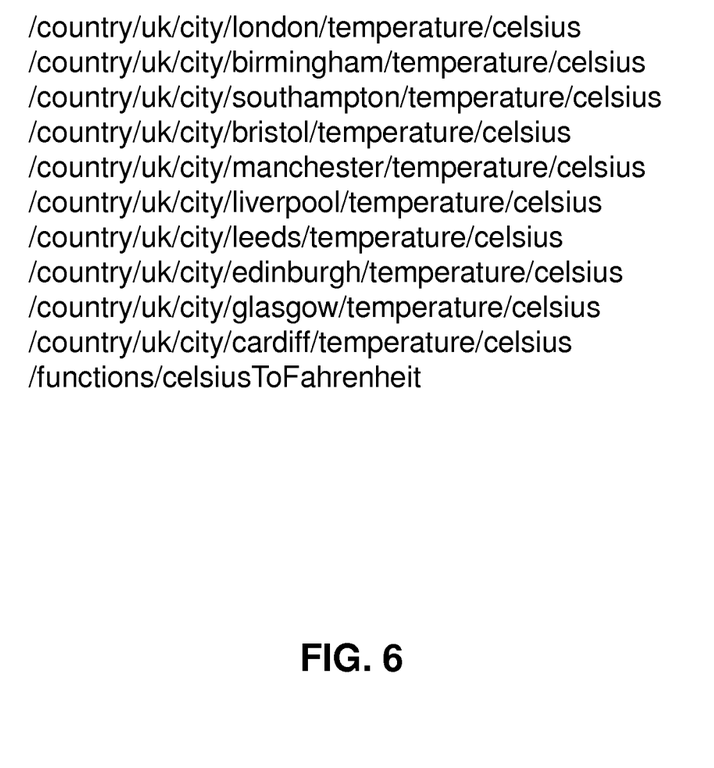
FIG. 6 is a diagram of a representation of an example of an implementation of a topic tree in accordance with the present subject matter.

FIG. 1 is a block diagram of components of an example of an implementation of a publish/subscribe system suitable to embody the present subject matter and comprising a plurality of publishers 1, 2 and subscribers 3, 4 with an intermediary message broker 5. As represented at 2 and 4, and described in greater detail below, some publishers may also be subscribers and vice versa. The message broker 5 includes a message store 6 for holding received messages, and a topic tree store 7 holding a hierarchical data structure of topics available for subscription (FIG. 6 illustrates such a topic tree). Also comprised within the message broker 5 is a matching engine 8 used in the matching of published messages to subscribers of particular topics.

Figure 2:
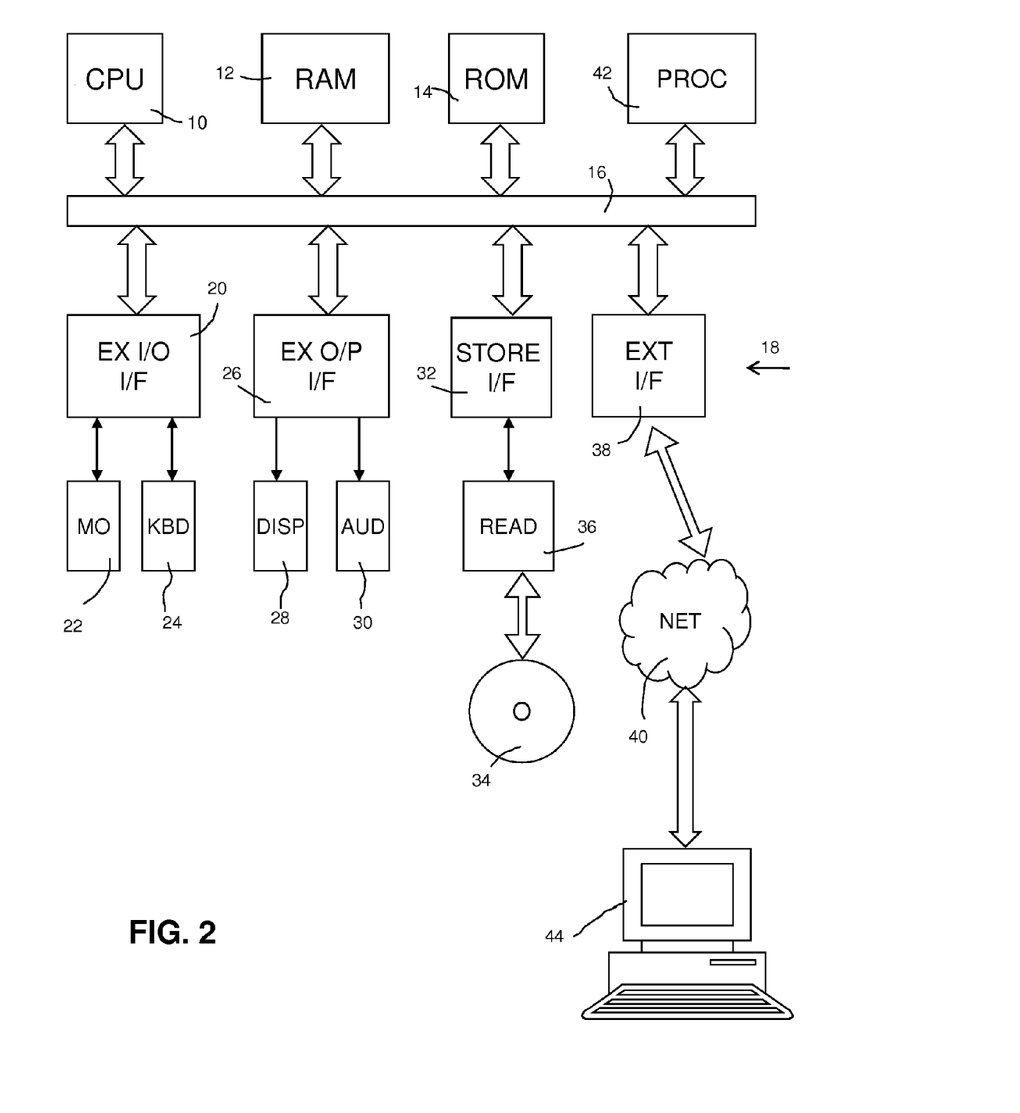
FIG. 2 is a block schematic diagram that schematically represents components of an example of an implementation of a multiprocessor computer system suitable to embody the broker of FIG. 1 in accordance with the present subject matter.

FIG. 2 is a block schematic diagram that schematically represents components of an example of an implementation of a multiprocessor computer system suitable to embody the message broker 5 of FIG. 1. A processor, central processing unit (CPU) 10, is coupled with random access memory (RAM) 12 and read only memory (ROM) 14 by an address and data bus 16. Referring back to FIG. 1, RAM 12 holds the message store 6 and topic tree store 7, and the CPU 10 provides the matching engine 8. Also connected to the CPU 10 via the address and data bus 16 is a further processor 42, which may be a further CPU sharing tasks with the first CPU 10, or may be a coprocessor device 42 supplementing the function of the CPU 10, handling processes such as floating point arithmetic, graphics processing, signal processing, and encryption. Each of these internal hardware devices 10, 12, 14, and 42 includes a respective interface (not shown) supporting connection to the address and data bus 16. These interfaces are conventional in form and need not be described in further detail.

Also connected to the CPU 10 via the address and data bus 16 are a number of external hardware device interface stages (generally denoted 18). A first interface stage 20 supports the connection of external input/output devices, such as a mouse 22 and/or keyboard 24. A second interface stage 26 supports the connection of external output devices such as a display screen 28 and/or audio output device 30, such as headphones or speakers. A third interface stage 32 supports the connection to external data storage devices in the form of computer readable media. Such external storage may, as shown, be provided by a removable optical or magnetic disc 34 (accessed by a suitably configured disc reader 36). Alternatively or additionally, the external storage may be in the form of a solid state memory device, such as an extension drive or memory stick. The external storage may contain a computer program, containing program software code portions, which, when run by the CPU 10, perform processing according to the present subject matter. A fourth interface stage 38 supports connection of the system to remote devices or systems via wired or wireless networks 40, for example over a local area network (LAN) or via the Internet. A further computer system 44 hosting a publisher and/or subscriber is shown coupled via the network(s) 40.

Figure 3:
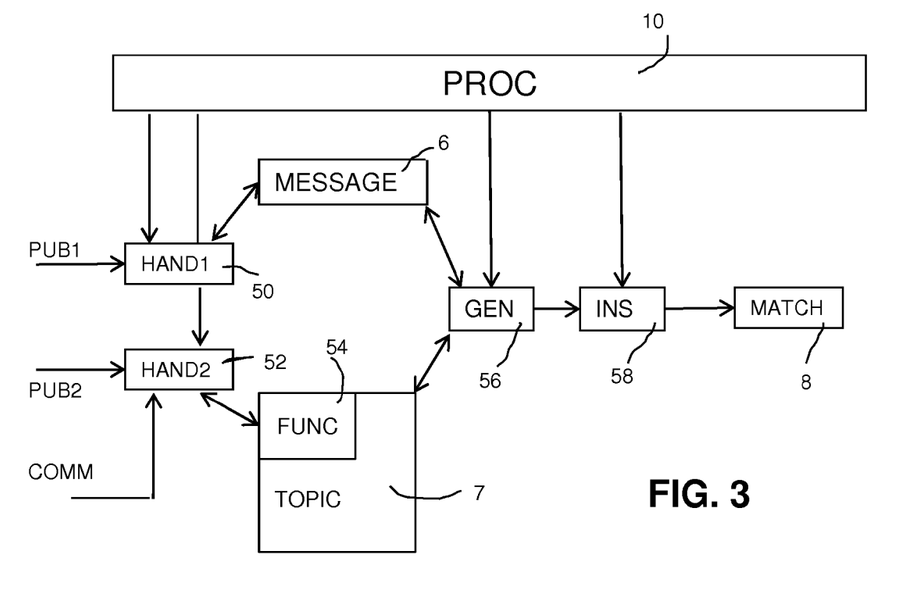
FIG. 3 is a block diagram and shows functional components of the example implementation of the message broker in the system of FIG. 1 in accordance with the present subject matter.
Figure 4:
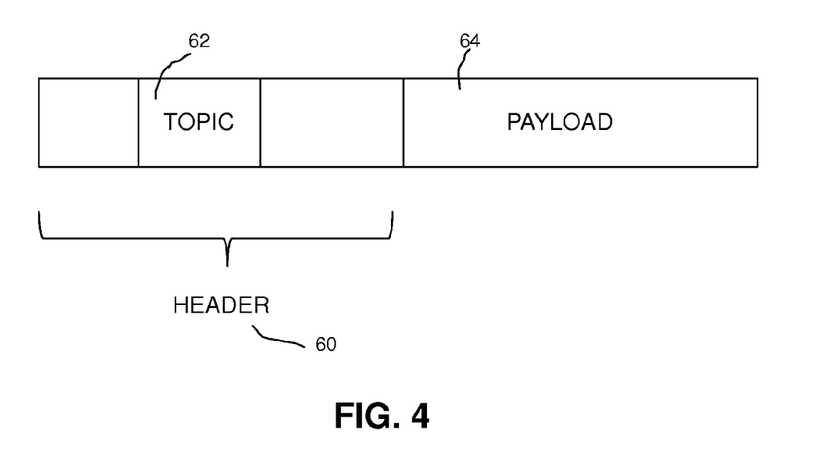
FIG. 4 schematically represents an example of an implementation of a data message output by a publisher in accordance with the present subject matter.

FIG. 3 is a block diagram and shows in more detail the functional components of the example implementation of the message broker 5 of FIG. 1. Controlling operation is a processor (CPU 10 of FIG. 2) that links to a first message handler 50 for handling a first message published by a first publisher, and a further message handler 52 for handling a second message published by a second publisher. Each of the message handlers 50, 52 (which may functionally be a feature of the CPU 10) is arranged to identify incoming messages, extract the content therefrom, and store it in memory. In this example, the message handler 50 receives a data message, the form of which is generally illustrated in FIG. 4. An input command COMM in FIG. 3 may allow modifying or deleting stored function data.

FIG. 4 schematically represents an example of an implementation of a data message output by a publisher, the message comprising a header portion 60 including topic data 62 and a data payload 64 for onward transmission to one or more subscribers. These messages are buffered or queued in the message store 6.

The message handler 52 receives a function message containing a function to be applied for the modification of a data message payload. These functions are extracted and stored in a dedicated (reserved function) area 54 of the topic tree store 7 in memory. This part of the topic tree may be reserved at a fixed location for all servers, or more practicably an administrator-defined topic area is reserved instead.

FIG. 6 is a diagram of a representation of an example of an implementation of a topic tree. As shown by the last entry in the example topic tree of FIG. 6, all functions are suitably stored under the topic/function. The reserved function topic stores both the function definitions and the code associated with that function. The name and parameters of the function are stored as a sub-topic of the reserved function area 54 and the function code is the payload of that topic.

A further input COMM to the second message handler 52 receives control commands relating to stored functions. This is described in more detail below.

Also linked to, and optionally hosted by, the CPU 10 is a generator stage 56 connected with the message store 6 and topic tree store 7. The generator stage 56 is adapted to extract message payload data from the message store 6, extract a function to be applied to that payload data from the reserved function area 54 of topic tree store 7 in memory, and to apply that function to generate modified payload data. Examples of payload data modification are given below.

From the generator stage 56, the modified payload data is passed to an inserter stage 58 linked to, and optionally hosted by, the CPU 10. The inserter stage 58 is configured to insert the modified payload data into a new message, which new message is then passed to the matching engine 8 for onward distribution to those subscribers that have subscribed to receive the modified form of the originally published message.

Figure 5:
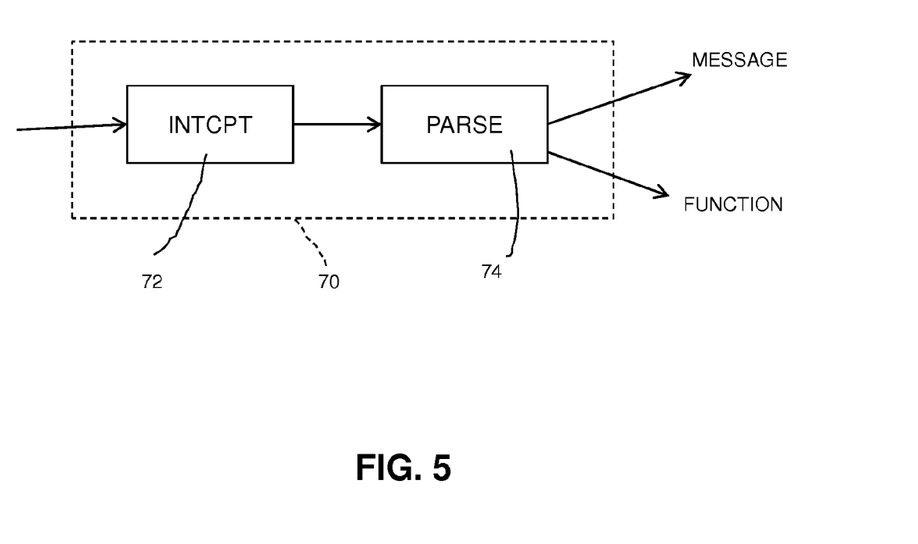
FIG. 5 is a block diagram and shows an example of an implementation of an alternative arrangement of a message handler to that described in FIG. 3 in accordance with the present subject matter.

FIG. 5 is a block diagram and shows an example of an implementation of an alternative arrangement of a message handler to that described in FIG. 3. It should be noted that the first and second message handlers 50, 52 may be combined into a single device as represented by FIG. 5. The handler 70 receives both data and function messages from publishers and subscribers. An intercept stage 72 identifies a message, and a parser stage 74 determines whether it is a data message or a function message.

Figure 7:
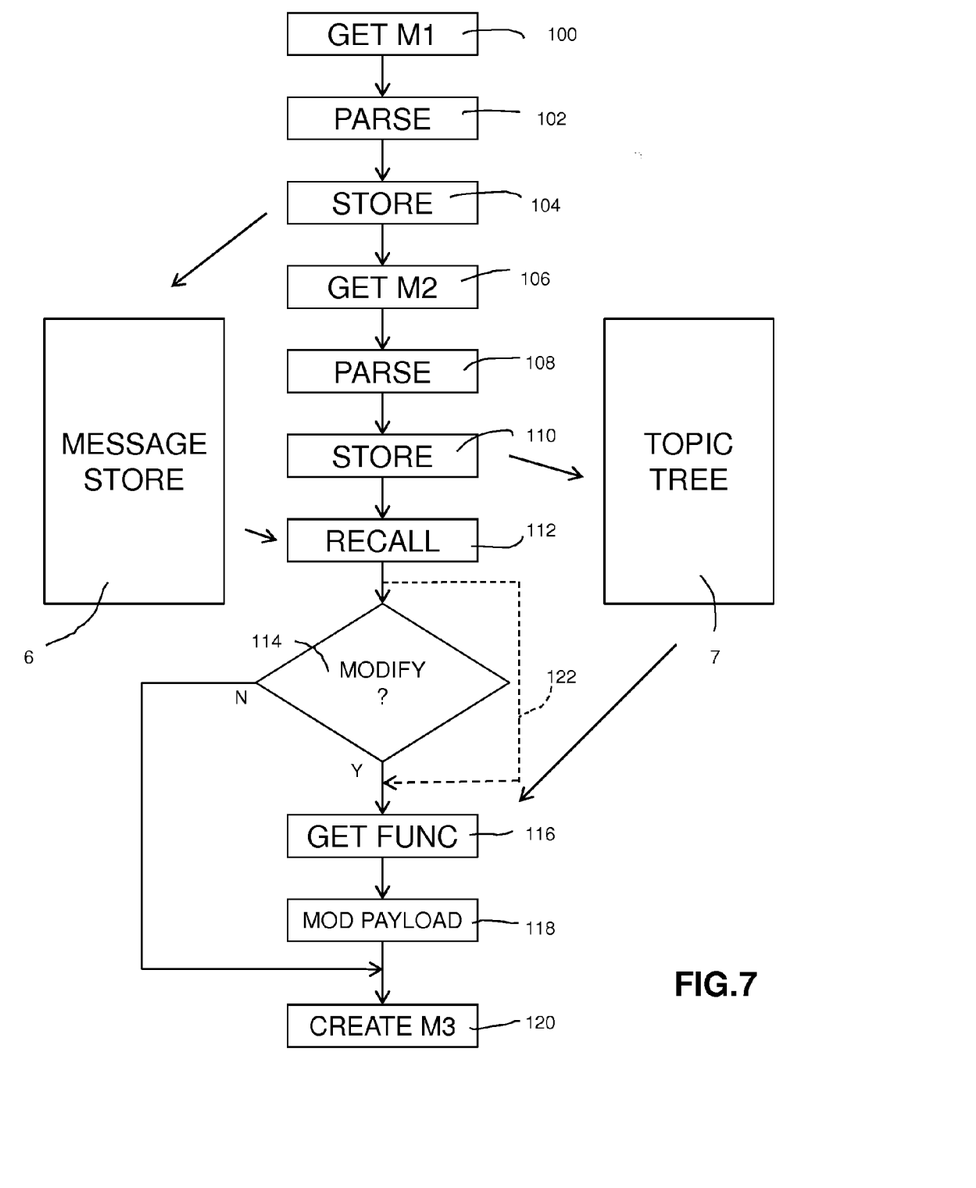
FIG. 7 is a flowchart representation of an example of an implementation of a method in accordance with the present subject matter.

FIG. 7 is a flowchart representation of an example of an implementation of a method for performing the present subject matter. A message handling procedure embodying the present subject matter will now be described with reference to the flowchart of FIG. 7. The process starts at step 100 with the receiving of a first message M1. In this example, M1 is a data message carrying a data payload for onward transmission to a subscriber following payload modification. At step 102, the message M1 is parsed to identify the payload (content) therein. At step 104, the message payload (together with associated topic or topic data) is extracted and stored in the message store 6.

At step 106, a second message M2 is received. The second message M2 carries data defining a function that may be applied to a data message payload. The second message M2 is published by a second publisher, the first publisher, or a subscriber. At step 108, this second message M2 is parsed to identify the function data therein. At step 110, the function data is extracted and stored in a reserved area of the topic tree store 7 in memory, as described above. The receiving and processing of the second message M2 may occur before that for the first message M1. Alternatively, if there are multiple parallel inputs, the initial processing of messages M1 and M2 may occur simultaneously. It should also be noted that there are likely to be plural first and second messages. The data messages may be queued to be handled in turn, while the function messages may be stored in random access storage such that each function may be accessed directly.

At step 112, the received first message content is recalled from the message store 6. The message store 6 may act as a queue for data messages awaiting processing and distribution. At step 114, a determination is made as to whether or not the message payroll is to be modified. If so, at step 116, the function to be applied is identified (from those received and stored), and called up from the topic tree store 7. At step 118, the payload is modified according to the function. Example functions are given below.

Following modification at step 118, or following a determination at step 114 that no modification is required, the payload data is inserted into a new message M3 at step 120 for onward transmission to subscribers. The creation of message M3 will also reference the topic or topic data associated with the original message M1 to enable an appropriate topic to be applied to message M3.

Figure 8:
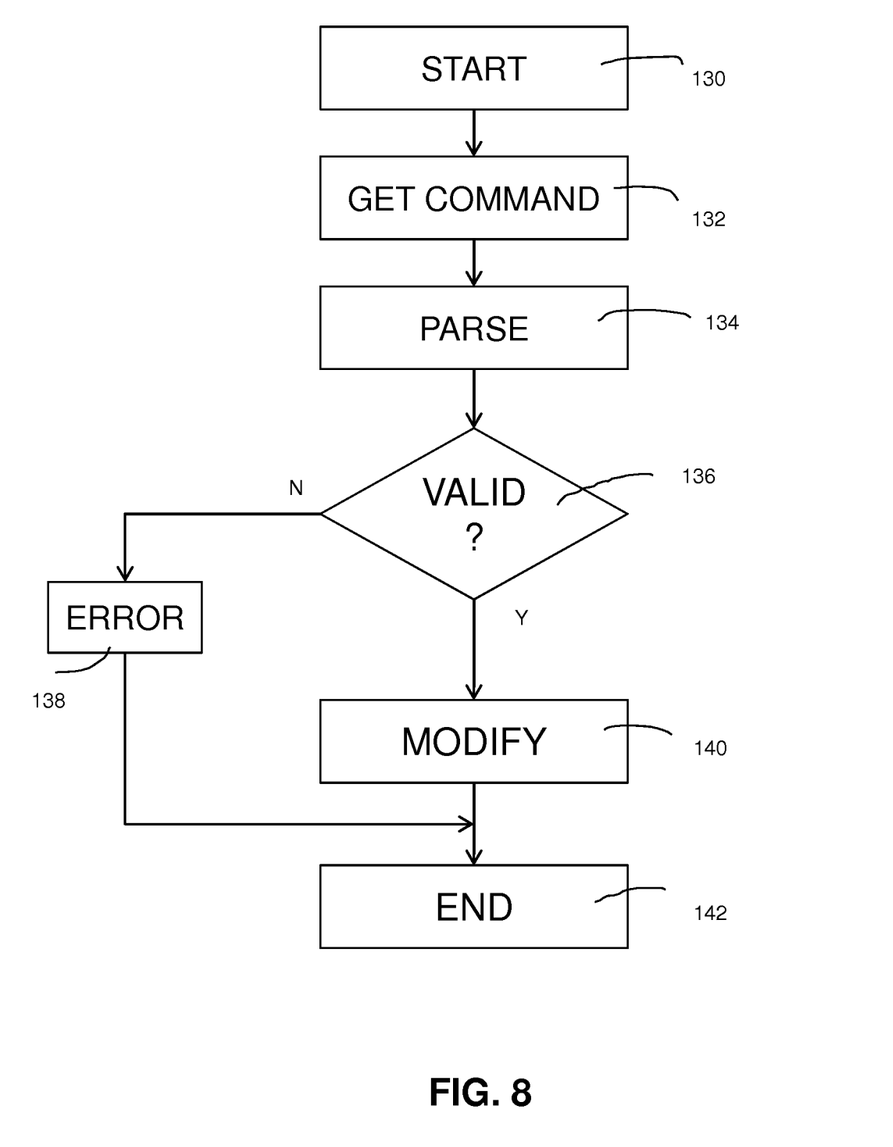
FIG. 8 is a flowchart representation of an example of an implementation of control command handling in accordance with the present subject matter.

FIG. 8 is a flowchart representation of an example of an implementation of control command handling. As described above, with reference to input command COMM in FIG. 3, the method may further comprise modifying or deleting stored function data. This is illustrated by the flowchart of FIG. 8 in which, following the start 130, at step 132, a function modification command message is received. At step 134, the function modification command message is parsed to identify the command and, at step 136, the command is validated. The validation suitably not only checks whether the command is supported by the system, but also whether it is from a source approved to issue such a command. For example, where the command is to delete a particular stored function, permission to delete the stored function may be restricted to the publisher or subscriber that originated that function and to a system administrator. Commands to amend functions rather than delete may similarly be restricted, with the system maintaining a list of stored functions with read/write access permissions for each.

If the validity check at step 136 proves negative, at step 138 an error message is generated, suitably as a message to the originator of the command. Such an error message may indicate that the function sought to be amended or deleted does not exist on the system, or that the requester does not have the requisite permission to cause the amendment or modification.

If the validity check at step 136 is positive, the process moves to step 140 in which the identified function is amended or deleted. Optionally a confirmation message (not shown) may be returned to the requester following the modification step 140, following which the process ends at 142.

While deletion of stored functions is as described above, amending an existing stored function is more complex requiring knowledge of the stored form of the function. Where permission to amend is limited to the function originator, a method to achieve amendment is for the originator to republish the function message (in amended form) to the same topic such that it overwrites the original version of the function. In like manner, deletion may be achieved by publishing a null message to the original function location.

A further functionality that may be performed is to forcefully apply a function such that one or more particular functions are applied to modify the payload data of all messages published to an identified topic. Using the temperature sensor example from above, if a plurality of temperature sensors publish temperature data in Fahrenheit to a particular topic, and if all those sensors were replaced with models giving temperature readings on the Kelvin scale, a single function may be applied to cause all temperature data published to that topic to be converted to Fahrenheit. This forced application is represented by the dashed line 122 in FIG. 7 that bypasses the decision (whether to modify) at step 114.

Turning now to some example functions by way of illustration only, and using the example of converting Celsius to Fahrenheit:

Aspect 1: Defining the Function

---
Topic = /functions/celsiusToFahrenheit
Data = return (? * 9/5 + 32);
---

This example uses an arbitrary scripting language, and has a syntax similar to that of Prepared Statements in structured query language (SQL). As such, the question mark "?" in the formula is replaced by the argument from the function call. Where there are multiple arguments, the first question mark matches the first argument, the second one matches the second argument, and so on.

Aspect 2: Subscribing to a Topic and Obtaining the Resulting Value from the Function Assuming a temperature sensor is publishing Celsius values to the topic "/path/to/sensor," a subscriber may then subscribe to a pseudo-topic:

/functions/celsiusToFahrenheit(/path/to/sensor)

This pseudo-topic would return the temperature in Fahrenheit. To do this, it takes the data from /path/to/sensor and passes that data into the function celsiusToFahrenheit as the first (and only) argument. This data is used by the first (and only) question-mark, and is then mathematically manipulated, producing a Fahrenheit equivalent.

Aspect 3: Publishing a Message that is Immediately Translated

Similarly, if the temperature sensor wanted to convert its readings to Fahrenheit for everyone, it would publish to the pseudo-topic:

/path/to/sensor(/functions/celsiusToFahrenheit)

This pseudo-topic would take the payload/data, pass it in to the function, and then publish the resulting value on the real topic "/path/to/sensor."

Aspect 4: Executing a Function on a Topic for All Subscribers

If a third party wanted to set a topic to always convert values from Celsius to Fahrenheit, it may send a control message to the broker:

control("/path/to/sensor", "/functions/celsiusToFahrenheit")

The broker may then run the celsiusToFahrenheit function every time it received a message on "/path/to/sensor" before broadcasting the resulting value.

The actual function may be implemented with any language that may be interpreted on the broker—for example, a broker written in Java™ programming language could easily use JavaScript® as the scripting language by using a "Script Engine," which would then allow the users to make use of normal JavaScript® function calls within their function. In this way, more complicated formulae may exist, such as:

---
Topic = /functions/isFreezing
Data = if (? <= 0) { return "true"; } else { return "false"; }
---

In one example use:

subscribe("/functions/isFreezing(/path/to/sensor)")

receives the word "true" if the "/path/to/sensor" value is less than or equal to zero (0), otherwise it receives the word "false."

In another example use:

---
publish("/freezingStatus(/functions/isFreezing)", −5)
publishes the word "true" on the topic "/freezingStatus."
---

In another example formula:

---
Topic = /functions/absoluteValue
Data = return Math.abs(?);
---

In an example use:
subscribe("/functions/absoluteValue(/path/to/sensor)")
receives the absolute value of the sensor reading.
In a further example formula:

```
Topic = /functions/multiply
Data = return (? * ?);
```

In an example use:

```
subscribe("/functions/multiply(/path/to/sensor,/
path/to/conversionFactor)")
returns "/path/to/sensor" multiplied by "/path/to/conversionFactor."
```

In another example use:

```
subscribe("/functions/multiply(/path/to/sensor, 100)")
returns the value of "/path/to/sensor" multiplied by one hundred (100).
```

It should be noted that the subscriptions are sustained in the same way that normal topic subscriptions are in conventional publish/subscribe systems. As a result, every time a user publishes to a topic that another user is subscribed to, via a function, the subscriber will be notified of the resulting value.

As described above, the functions may be edited by re-publishing the payload to the same topic. Typical publish/subscribe systems provide for some level of message persistence, where at least some messages may be retained on the system after delivery to subscribers. In the present invention, all functions may be published with the retained flag set to true so that they exist permanently, until a null message is published to delete the function.

To summarize, the present subject matter allows a greater level of consistency and convenience for all users of the system by allowing data manipulation to occur on the broker. This manipulation may be controlled globally, by the subscriber, or the publisher.

While embodiments of the present invention have been described above, the technical scope of the invention is not limited to the scope of the above-described embodiments. It should be apparent to those skilled in the art based upon the description above that various changes or improvements may be made to the example embodiments. It is apparent from the description of the appended claims that implementations including such changes or improvements are encompassed in the technical scope of the subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for modified payload data handling in a publish/subscribe system, comprising:
a processor;
a memory coupled with the processor;
a first computer handler for handling a received first message published by a first publisher, the first message comprising a message header and payload data, with the first computer handler being programmed to identify and extract the payload data and store the payload data of the received first message in the memory;
a second computer handler for handling a received second message published by a second publisher, the second message comprising function data that provides a function to modify the payload data of the received first message, with the second computer handler being programmed to identify and extract the function data and store the function data of the received second message in the memory;
a generator programmed to modify the extracted and stored payload data of the received first message according to the function of the stored function data of the received second message; and
an inserter programmed to insert the modified payload data of the received first message into a third message for distribution to a subscriber programmed to process the modified payload data in the third message.

2. The apparatus of claim 1, where the first and second computer handlers comprise a single device programmed to distinguish between the received first message and the received second message.

3. The apparatus of claim 1, where the message header of the received first message comprises topic data, the memory contains a topic tree used in distribution of messages to subscribers according to topic, and the second computer handler is programmed to store the extracted function data in a predetermined location within the topic tree.

4. The apparatus of claim 1, where the second computer handler is further programmed to receive and process a plurality of second messages and store respective sets of function data received via the plurality of second messages, and the generator is further programmed to identify which, if any, set of stored function data to use in the modification of the payload data of the received first message.

5. The apparatus of claim 1, where the second computer handler is further programmed to, in response to receipt of a predetermined command, verify a source of the predetermined command as a precondition of deleting the stored function data, and delete the stored function data.

6. The apparatus of claim 1, where the second computer handler is further programmed to, in response to receipt of a predetermined command, modify the stored function data.

7. A computer-implemented method for modified payload data handling in a publish/subscribe system, comprising:

receiving a first message published by a first publisher, the first message comprising a message header and payload data;

identifying the payload data within the received first message;

extracting and storing the payload data of the received first message;

receiving a second message published by a second publisher, the second message comprising function data that provides a function to modify the payload data of the received first message;

identifying the function data within the received second message;

extracting and storing the function data of the received second message;

using the function of the stored function data of the received second message to modify the extracted and stored payload data of the received first message; and creating a third message comprising the modified payload data of the received first message for distribution to a subscriber programmed to process the modified payload data in the third message.

8. The computer-implemented method of claim 7, further comprising receiving a plurality of second messages, extracting and storing respective sets of function data received via the plurality of second messages, and determining for the received first message which, if any, set of stored function data to use to modify the payload data of the received first message.

9. The computer-implemented method of claim 7, where the subscriber is also the second publisher.

10. The computer-implemented method of claim 9, where there are a plurality of subscribers, at least one of which subscribes to the received modified payload data modified by the function, and the second message comprising the function data that provides the function is originated by another subscriber.

11. The computer-implemented method of claim 7, further comprising, in response to receipt of a predetermined command, deleting the stored function data.

12. The computer-implemented method of claim 11, further comprising, in response to receipt of the predetermined command, verifying a source of the predetermined command as a precondition of deleting the stored function data.

13. The computer-implemented method of claim 7, where the first publisher comprises a plurality of first publishers publishing messages to respective topics and a plurality of subscribers each receiving messages on one or more of the topics and, further in response to receipt of a predetermined command, applying one of a plurality of sets of stored function data to modify payload data of all messages published to an identified topic.

14. The computer-implemented method of claim 7, where the first publisher is also the second publisher.

15. A computer program product comprising a computer readable storage device including computer readable program code, where the computer readable program code when executed on a computer causes the computer to:

receive a first message published by a first publisher, the received first message comprising a message header and payload data;

identify the payload data within the received first message;

extract and store the payload data of the received first message;

receive a second message published by a second publisher, the received second message comprising function data that provides a function to modify the payload data of the received first message;

identify the function data within the received second message;

extract and store the function data of the received second message;

use the function of the stored function data of the received second message to modify the extracted and stored payload data of the received first message; and create a third message comprising the modified payload data of the received first message for distribution to a subscriber programmed to process the modified payload data in the third message.

16. The computer program product of claim 15, where the computer readable program code when executed on the computer further causes the computer to receive a plurality of second messages, extract and store respective sets of function data received via the plurality of second messages, and determine for the received first message which, if any, set of stored function data to use to modify the payload data of the received first message.

17. The computer program product of claim 15, where the computer readable program code when executed on the computer further causes the computer to, in response to receipt of a predetermined command, delete the stored function data.

18. The computer program product of claim 17, where the computer readable program code when executed on the computer further causes the computer to, in response to receipt of the predetermined command, verify a source of the predetermined command as a precondition of deleting the stored function data.

19. The computer program product of claim 15, where the first publisher comprises a plurality of first publishers publishing messages to respective topics and a plurality of subscribers each receiving messages on one or more of the topics, and where the computer readable program code when executed on the computer further causes the computer to, in response to receipt of a predetermined command, apply one of a plurality of sets of stored function data to modify payload data of all messages published to an identified topic.

20. The computer program product of claim 15, where the first publisher is also the second publisher.

* * * * *